May 14, 1957 J. C. MERRILL ET AL 2,792,208
CONTROL PROVISION FOR RECORDING MECHANISM
Filed Dec. 29, 1953 2 Sheets-Sheet 1

INVENTORS
J. CARTER MERRILL
JOHN A. ROBERTS
BY
ATTY.

May 14, 1957   J. C. MERRILL ET AL   2,792,208
CONTROL PROVISION FOR RECORDING MECHANISM
Filed Dec. 29, 1953   2 Sheets-Sheet 2

INVENTORS
J. CARTER MERRILL
JOHN A. ROBERTS
BY
ATTY.

United States Patent Office 2,792,208
Patented May 14, 1957

2,792,208

CONTROL PROVISION FOR RECORDING MECHANISM

Justin Carter Merrill, St. Johnsbury, Vt., and John A. Roberts, Davenport, Iowa, assignors to Fairbanks, Morse & Co., Chicago, Ill., a corporation of Illinois Application December 29, 1953, Serial No. 400,992

15 Claims. (Cl. 265—5)

This invention relates to improvements in mechanism for recording or printing numerical values determined by weighing apparatus and the like, and has particular reference to novel and effective control provisions for recording or printing mechanism employed for example, with weighing apparatus of variable capacity or so-called drop-weight capacity types, provided for assuring the recording or printing of weight values accurately in accordance with weight determinations by the weighing apparatus under drop-weight applied conditions.

In drop-weight capacity scale and weight recording or printing assemblies of the general character disclosed in Hadley et al., Patent 2,070,011 of February 9, 1937, which patent is hereby incorporated by reference, the type numeral elements of the printer are positioned according to scale operated stepped discs and a stepped disc positioned in accordance with application or removal of the scale capacity changing drop-weights. In the operation of such assemblies, it is found that under certain conditions to be pointed out, inaccuracies in the printing of certain weight values occur. For example, assume a scale and printer assembly of the type indicated, wherein the scale capacity without drop-weights is say 3000 pounds, while scale capacity is increased by application of one or more drop-weights each of 2000 pound value. Assume further, that the scale is subjected to a load of 10,053 pounds. Now, the scale in coming to balance with four 2000 pounds drop-weights applied, will position the scale operated units, tens, hundreds, and thousands stepped discs such that upon displacement of disc sensing fingers to disc engagement, the printer type numeral elements as actuated by the sensing fingers, will be positioned for printing the weight value of 2053 pounds. However, in the mechanism of the example, the thousands denomination type numeral element has its position determined not only by the thousands stepped disc of the scale, but also through a differential device by the position of the drop-weight stepped disc. A sensing finger included in the differential device, is displaced to sense the latter stepped disc in its position determined by the application of the four drop-weights, and in so doing, effects movement of the thousands type numeral element past a position where the "9" type is effective so that a blank, i. e., no number, is disposed at the printing station, thus setting up only "053" at the printing station. Hence, under the situation as exemplified above, actuation of the printer would produce a printed record of the weight of the applied load as "053" pounds, instead of the true weight, 10,053 pounds. It is believed to be obvious now from the foregoing, that if the weight of the scale applied load were 9999 pounds or under, this error would not occur, and that the error range is above 9999 pounds.

In the scale and printer assembly heretofore described, the error range occurred at the highest load weight values. However, printing errors may occur at low, intermediate or high load weights and several error ranges may exist in a given scale and printer assembly. For example, assume a scale and printer assembly, wherein the scale capacity without drop-weights is 600 pounds, while scale capacity is increased by application of one or more 500 pound drop-weights. With a 1053 pound load, the scale in coming to balance, with one 500 pound drop-weight applied, will position the units, tens and hundreds stepped discs such that upon displacement of disc sensing fingers to disc engagement, the printer type numeral elements, will be positioned for printing the weight value of 553 pounds. The hundreds type numeral element has its position determined also by the position of the drop-weight stepped disc. A sensing finger is displaced to sense the drop-weight stepped discs position, determined by the application of the first drop-weight, and in so doing, causes further movement of the hundreds type numeral element past a position where the "9" type numeral is effective in the hundreds column so that a blank appears at the printing position. Thus actuation of the printer produces a printer record of applied load as "53" pounds instead of the true weight, 1053 pounds. If the load weight is below 999 pounds, this error would not occur, and with two drop-weights applied the printer would properly indicate weights above 1100 pounds as will be hereinafter explained. Thus the critical error range in respect to recorder operation when the first drop-weight is applied, is between 999 pounds and 1100 pounds. With three 500 pound drop-weights the critical error range is between 1999 and 2100 pounds and with five drop-weights the error range is between 2999 and 3100 pounds, while no error range is present with two or four 500 pound drop-weights applied.

In essence, it may be stated that the indicated error condition is present in scale and printer assemblies of the character given, whenever the sum of the scale capacity without drop-weights and the total value of one or more applied drop-weights contains one more digit than the number of digits in either the scale capacity without drop-weights or the individual drop-weight value.

Therefore, it is the principal object of the present invention to provide for scale and printer assemblies of the character above briefly described, control mechanism effective in the critical error range of printer operation as above outlined, to assure conditioning of the printer for correct printing of the applied load weights when the value of the latter is within the error range as herein defined.

Another object is to provide control means for the purpose of the aforesaid principal objective, comprising relatively simple yet highly effective mechanism, which is operatively associated with the differential device including the sensing fingers associated with the scale positioned stepped disc and the stepped disc positioned in accordance with drop-weight application, for response to actuation of the differential device to and in the critical range hereinbefore indicated to alter the action of the sensing finger associated with the drop-weight positioned stepped disc such that said finger in sensing engagement with the disc, properly positions the type numeral element for the succeeding printing operation. As will presently more fully appear, the control mechanism is in the nature of a digit carry-over device which in the critical range of scale operation and printer conditioning for load weight printing, assures proper positionment of the high order, as the thousands, type numeral element.

These and other objects and advantages will become more readily apparent as the description proceeds and is read in conjunction with the drawings in which:

Fig. 3 is a partial plan view of the drop-weight positioned discs, sensing finger and control provision shown in Fig. 2.

Figure 1:
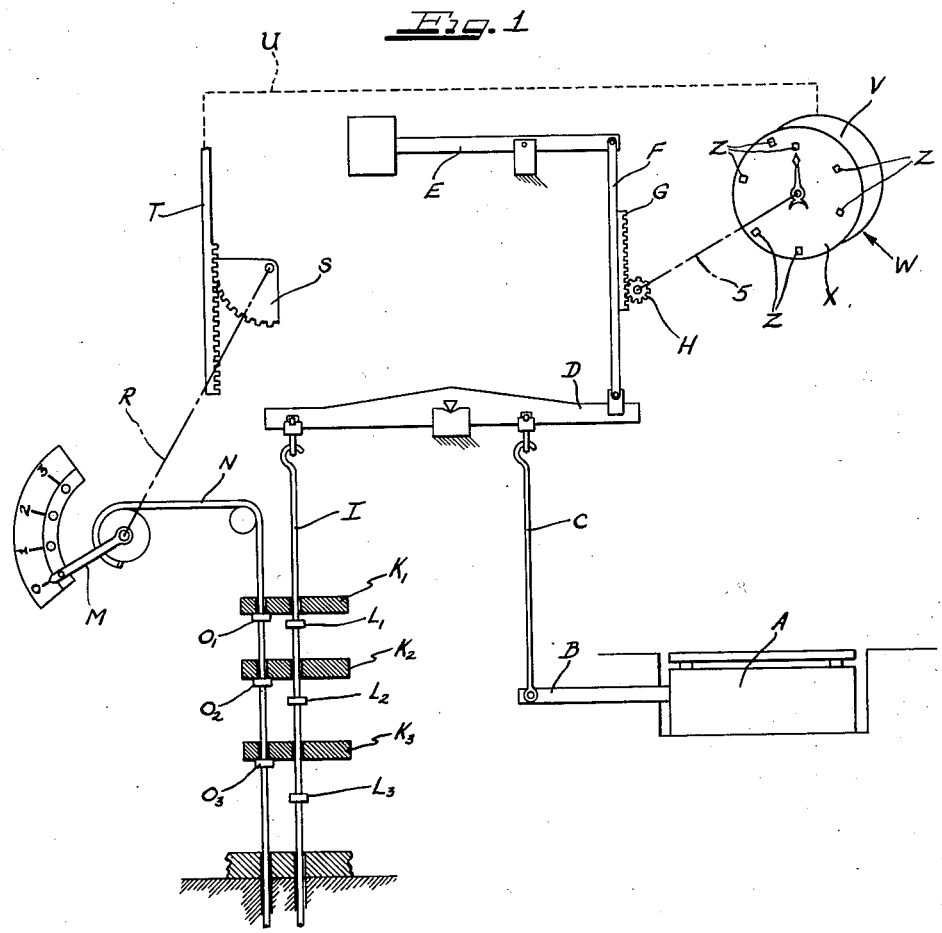
Fig. 1 is a diagrammatical view of a platform type scale including a drop-weight mechanism.

Fig. 1 illustrates diagrammatically, a scale load platform and lever structure A having its output lever B connected through a rod or steelyard C to a pivoted balance beam D, and a pendulum type counter-balance device E connected to the beam D by a rod F having a toothed member or pinion rack G thereon for driving pinion H of the dial indicator shaft 5. The scale shown is of a variable capacity type, with weighing capacity increases effected by any suitable, well-known device such as the drop-weight arrangement diagrammatically exemplified in operative association with the beam D through drop-weight rod I. The rod I extends freely through drop-weights $K_1$, $K_2$ and $K_3$, and supports collars $L_1$, $L_2$ and $L_3$ respectively below the drop-weights $K_1$, $K_2$ and $K_3$ and in the relatively spaced relation shown. Drop-weight application is controlled from a control lever M through a cable N having drop-weight support collars $O_1$, $O_2$ and $O_3$ individual to the drop-weights respectively. With control lever M at its initial or "0" position as shown in Fig. 1, the drop-weights are elevated by collars $O_1$, $O_2$ and $O_3$ to clear them from engagement with the collars $L_1$, $L_2$ and $L_3$ on rod I. Thus under this condition, the beam D is free of capacity increasing drop-weights. Disposing lever M at its "1" position, serves through cable N to lower the drop-weights such that drop-weight $K_1$ now rests on collar $L_1$, while drop-weights $K_2$ and $K_3$ remain out of engagement with collars $L_2$ and $L_3$. Drop-weight $K_1$ then loads beam D to increase the capacity of the scale by the value of the drop-weight. Similarly, disposing lever M at its "2" position, disposes drop-weight $K_2$ on its collar $L_2$, thereby increasing the scale capacity to the extent of the sum of the drop-weights $K_1$ and $K_2$. Lever M in its "3" position, applies drop-weight $K_3$ on its collar $L_3$, so that now all of the drop-weights are effective or beam D, with scale capacity increase equal to the sum of the weight values of the drop-weights. While but three drop-weights are shown, it is understood of course, that any practical number of drop-weights may be employed.

The drop-weight control lever M is utilized also and through a suitable shaft or other connection indicated by the broken line R, to operate a gear sector S which in turn actuates a rack bar T. Bar T is suitably extended as indicated by the broken line U, to the back-chart V of the scale dial indicated at W, for disposing the back-chart relative to the front chart X such as to alter the dial reading in accordance with drop-weight capacity application, as in a manner well known in the art.

While the scale capacity drop-weight system is here described only in respect to a diagrammatic showing thereof, reference may be had to Bousfield Patent 2,014,275 for a more complete disclosure of the structure and operation of such drop-weight mechanism. Moreover, the scale and drop-weight capacity system as exemplified in Fig. 1, embodies in the dial shaft 5 and the drop weight bar T, the necessary elements for the translation of scale determined load weights to a suitable recorder or printer mechanism the basic elements of which are diagrammatically shown in Fig. 2. For a more detailed disclosure of the recorder structure and its association with dial shaft 5 and drop-weight bar T, reference may be had to Patent 2,070,011 to Hadley et al., issued February 9, 1937.

Figure 2:
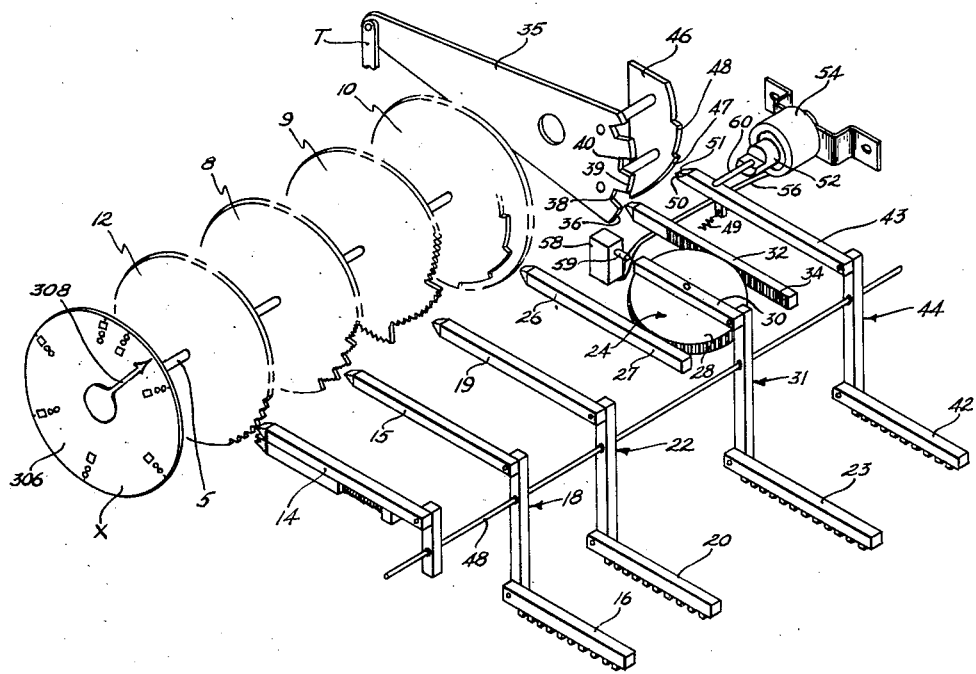
Fig. 2 is a schematic drawing of the scale dial, dial positioned stepped discs, drop-weight positioned discs, printer mechanism and one form of the novel control provision.

Referring to Fig. 2, the dial shaft 5 is extended as shown, for the operative support of a plurality of stepped discs 8, 9 and 10 and a toothed locating disc 12, these discs being keyed or otherwise fixed to the shaft so as to follow scale produced movements of the shaft. The stepped discs 8, 9 and 10 provide respectively, the units, tens and hundreds denominations of scale weights, while the disc 12 in cooperation with a holding finger 14 serves to hold the shaft 5 with the stepped discs in position following scale balance, to permit set-up of printing elements in accordance with the positions of the stepped discs. A sensing finger 15 is movable toward the steps of units disc 8 to sense the units denomination and locate the units printer type numeral element 16, as through suitable lever or linkage means 18, to position the type number corresponding to the disc step sensed, at the printing position ready for the printing operation. A similar sensing finger 19 is provided for the tens denomination disc 9, and is connected to the tens printer type element 20, through lever means 22. Since the scale and recorder system illustrated by Figs. 1 and 2 is one in accordance with the capacity example hereinbefore referred to as a 600 pound capacity dial scale with capacity increase in steps of 500 pounds, as by the 500 pound drop-weights $K_1$, $K_2$ and $K_3$, printing positionment of the hundreds denomination type element 23 is effected through a differential device 24 correlating the position of the hundreds denomination disc 10 with the condition of drop-weight application. The differential device provides a hundreds disc sensing finger 26 having a rack portion 27 in engagement with a gear wheel 28, the latter being rotatable on an axis carried by a longitudinally movable bar 30 paralleling finger 26. Bar 30 is connected by lever means 31 with the type element 23. In parallel with finger 26 is another finger 32 having a rack portion 34 engaging the opposite side of gear 28. Finger 32 is in sensing cooperation with the notched margin of a segment or member 35 rotatable about the axis of shaft 5 and positioned by the drop-weight bar T (Fig. 1). The notched margin of member 35 provides a first sensing surface 36 which, in the "0" position of lever M (no drop-weights applied), is in position for engagement by the finger 32; a notch 38 positionable in alignment with finger 32 upon the application of the first drop-weight $K_1$; a second sensing surface 39 for alignment with the sensing finger 32 when both drop-weights $K_1$ and $K_2$ are applied, and a second notch 40 for finger alignment when all three drop-weights are applied. Of course, with more than three drop-weights the segment 35 would include a corresponding additional number of alternate surfaces and notches. For purposes hereinafter to appear type element 23 is provided with type numbers 0, 1, 2, 3, 4, 5, 6, 7, 8, 9 and an extra 0 and 1 following the nine.

The member 35 also determines sensing set-up of the thousands denomination type element 42, as by a sensing finger 43 connected to element 42 by lever means 44 and operative relative to a thousands stepped sector or plate 46 carried by member 35. Sector 46 provides a first sensing step 47 corresponding to both the application of no drop-weights and the application of the first drop-weight $K_1$; and a second step 48 corresponding to the application of two drop-weights $K_1$ and $K_2$ and the application of the three drop-weights $K_1$, $K_2$ and $K_3$.

Except for the critical error range conditions hereinbefore pointed out, the scale recorder system as thus far described operates accurately to produce records of scale indicated weights. One such error condition occurs in the scale weighing range between 999 pounds and 1100 pounds. Repeating the example given, assume a scale load of 1053 pounds applied to scale A (Fig. 1), with the drop-weight lever M turned to position "1" applying the first drop-weight $K_1$ on the beam D. For a detailed explanation of the drop-weight and back chart apparatus, reference may be had to Bousfield Patent No. 2,014,275, issued September 10, 1935, but for the present disclosure it is only necessary to note that as lever M is turned to position "1," back chart V is moved by means of bar T and connection U to a position where appropriate numbers, which are printed on the back chart, show through the windows Z in the front chart to change from a chart reading range of from 0 to 600 pounds to a chart reading range of from 500 to 1100 pounds. The scale pointer is in the same position it would assume for a load of 553 pounds with no drop-weights applied, but due to the fact that the numbers in the front chart windows Z have been changed by the addition of drop-weight $K_1$ the scale visually indicates the correct reading, 1053 pounds. At the same time, the units and tens stepped discs 8 and 9 are positioned for set-up of the units and tens type element 16 and 20 by the sensing fingers 15 and 19, for printing the units and tens denomination of the weight, or "53." Also, the hundreds stepped disc 10 following movement of the dial shaft 5, is set-up for input to the differential 24 through sensing finger 26, of the hundreds denomination dial recording of "5." With application of drop-weight $K_1$, the segment 35 is moved to align its notch 38 with sensing finger 32 of the differential device. Thus as bar 30 is moved, both sensing fingers 26 and 32 are moved together by gear 28 until finger 26 engages stepped disc 10 and finger 32 engages the bottom of notch 38. This results in movement of bar 30 which then positions hundreds type element 23 past a position where the "9" type appears at the printing station so that the second "0" type is arranged at the printing station. Coincidentally with the foregoing, the thousands finger 43 is engaged with the first step 47 of sector or plate 46, thereby positioning the thousands type element 42 with its "0" type at the printing station, because the step 47 is effective equally for no drop-weights applied and with the first 500 pound drop-weight applied. Hence, the resulting printed record will show the weight as being "0053" pounds instead of the true weight of 1053 pounds.

In accordance with the present invention, such erroneous set-up of the printer type means is avoided under the error range condition by novel and effective means operatively responsive to displacement of the bar 30 of the differential device to the extent indicated, as to set-up the second "0" type numeral of the type element 23 at the printing station, for causing a shift or carry-over displacement of the thousands sensing finger 43 such that it engages the sector 46 to set-up the next higher type number "1" of the type element 42. As shown by Figs. 2 and 3, one embodiment of this means is of electrical form, in association with the sensing finger 43 wherein the latter is modified in structure to provide a second sector-abutment end 50. The finger end 50 is located rearwardly of the finger tip 51, which normally coacts with the steps of plate 46, by a distance equal to the difference between the radial extent of the sector steps 47 and 48. Thus by lateral deflection of the finger 43 (Fig. 3) to align the finger end 50 with the sector 46, engagement of this end with the sector step 47 will produce the desired, correct set-up of the type numeral "1" of type element 42 at the printing station. Shift of the sensing finger, which is normally urged by spring 49 to a position aligning tip 51 with sector 46, is here effected by the movable armature 52 of an electromagnet device 54 having its magnet winding 55 in an energizing circuit 56 controlled by a switch 58. Switch closing element 59, normally in switch-open position effected as by a spring (not shown), is in alignment with differential bar 30 such that when the latter is under displacement to the extent as before indicated, it will operate switch element 59 to close the switch and hence complete the circuit to winding 55. Resulting energization of the electromagnet, draws in the armature 52, which is suitably connected to finger 43 as by the link 60, thereby laterally shifting the finger to permit engagement of its end 50 with the sector 46. The required carry-over then is effected to give the correct recording or printing of the scale load of the example, as 1053 pounds.

Thus with one drop-weight applied for any load weight between 999 pounds and 1100 pounds, the combined movement of fingers 26 and 32 into engagement with disc 10 and sector 46 is sufficient to permit bar 30 to move to a switch closing position. Switch operation in turn increases the travel of finger 43, due to lateral deflection of the finger, to move type element 42 a distance sufficient to dispose a "1" at the printing station. When two 500 pound drop-weights are applied, the scale is conditioned to weigh any loads between 1000 and 1600 pounds, and there is no necessity for numeral carry-over since a "1" must always be printed in the thousands column. With two drop-weights applied, surface 39 of member 35 is aligned with finger 32 and step 48 of sector 46 is in alignment with finger 43. Thus finger 32 does not move into a notch on member 35 and type element 23 is positioned only by movement of finger 26 into engagement with hundreds disc 10. Finger tip 51 will always move into engagement with step 48 and position a "1" at the printing station, since bar 30 of differential 24 is never moved a distance sufficient to close switch 58 and laterally displace finger 43.

When handle M (Fig. 1) is moved to the "3" position to apply drop-weights $K_1$, $K_2$ and $K_3$, member 35 is moved to align notch 40 with finger 32 and step 48 of sector 46 remains in alignment with finger 43. The scale system is then in condition to weigh loads between 1500 and 2100 pounds. All loads between 1500 and 1999 pounds will be recorded without energization of winding 55 and consequent numeral carry-over, since the combined movement of fingers 26 and 32 does not cause bar 30 to move to its switch closing position, or stated another way ten or more hundreds are not sensed by fingers 26 and 32 to indicate that larger thousands number is required. For loads between 2000 and 2100 pounds bar 30 will close switch 58 to displace finger 43 so that finger end 50 is aligned with step 48 and movement thereagainst arranges a "2" on type element 42 at the printing station. It should be evident that in the scale and printer assembly now being described if four, six or any particular even number of drop-weights are applied carry-over will not be necessary and when five, seven, or any practical odd number of drop-weights are applied numeral carry-over is required for loads falling within error ranges.

As previously mentioned an extra "1" is also provided on hundreds type element 23. If 1100 pounds is to be weighed and printed with one 500 drop-weight applied, finger 26 will move against a sixth step on disc 10 to provide an input of "6" to differential 24 and finger 32 will move into notch 38 to provide an input of "5" to the differential. This results in a movement of type element 23 to a position past the second "0" where the second "1" is disposed at the printing station. Of course, when type element 23 moves past a position where the "9" is disposed in printing position, switch 58 will be closed to effect carry-over, i. e., laterally displace finger 43 and cause a "1" to be printed by element 42. It should be evident that other drop-weight values and scale capacities without drop-weights may require other additional type numbers on element 23.

Figure 4:
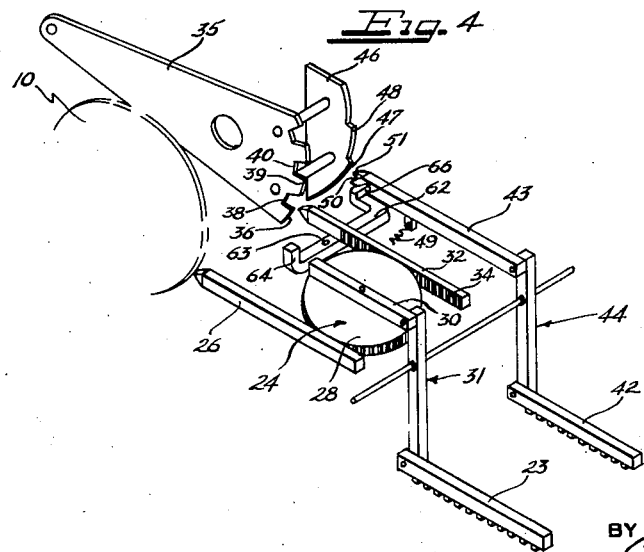
Fig. 4 is a fragmentary schematic view showing a mechanical form of the printing mechanism control provision.

Fig. 4 shows another form of the control provision for printing mechanism, wherein a mechanical arrangement is utilized to laterally displace thousands finger 43 during printing in the error ranges. A bell crank 62 pivoted on pin 63, has one end portion 64 aligned with bar 30, while the other end portion 66 is disposed adjacent and to one side of finger 43. If the combined movement of fingers 26 and 32 toward hundreds disc 10 and member 35 is sufficient to move differential bar 30 to a position representative of more than nine hundreds, bar 30 engages end portion 64 of bell crank 62 to pivot the bell crank in a clockwise direction (Fig. 4) and cause end portion 66 of the bell crank to bear against and laterally displace finger 43. This aligns the recessed finger end 50 with sector 46 to cause type element 42 to be moved a greater distance and thereby arrange a higher type number of type element 42 at the printing station.

From the foregoing it will be seen that the control provision of the present invention automatically arranges a higher numeral of one decimal column type element at the printing station, when the type element of the next lower decimal column assumes a position indicative of ten units in said lower decimal column. While the control provision is presently described as conditioning the thousands type element to print a higher number in the error range of operation, it will be evident that the control provision may be operative between decimal orders of tens and hundreds, thousands an ten thousands, etc. The control provision positions the higher order type element to indicate a greater number of units of that order by altering the extent of travel of the higher order sensing finger, or stated another way by changing the effective length of the higher order sensing finger.

With printers of the type shown in said Hadley et al. patent, the relationship between the scale capacity without drop-weights and the magnitude of the drop-weight values has been heretofore limited so as to avoid the presence of error ranges. The present invention permits greater flexibility in selecting the capacity value of the scale without drop-weights and the drop-weight values, since the correct weight is automatically printed even in the error ranges. Thus with the control provision the scale capacity without drop-weights plus the total weight of the drop-weights to be applied can equal a sum having more decimal orders than the decimal orders in the scale capacity without drop-weights and the individual drop-weight values.

While only certain forms of the control provision for recorders are shown, it should be appreciated that various modifications and changes may be made without departing from the scope of the present invention as defined in the following claims.

We claim:

1. In a recorder having a first finger movable to positions representative of the number of units of one decimal order and second finger means movable to positions representative of the number of units of a lesser decimal order, means to move said finger and finger means to said positions first means operable to change the extent of movement of said first finger, second means actuated by movement of said second finger means to positions representative of a predetermined number of units of said lesser order, and means connecting said second means to said first means to operate said first means when said second means is actuated.

2. In a recorder, a first finger movable to positions representative of the number of units of one order, a first type element positioned in accordance with the movement of said first finger, a second finger movable to predetermined positions, a third finger movable to predetermined positions, a differential mechanism connected to said second and third fingers, a second type element positioned by said differential mechanism in accordance with the conjoint movement of said second and third fingers, the position of said second type element representing the number of units of a lesser order than said one order, said first finger being adapted to travel predetermined distances representative of predetermined numbers of units of said one order, first means operable to increase the travel of said first finger by an amount representative of one unit of said one order, actuating means to initiate operation of said first means, and means movable by said differential mechanism to render said actuating means effective when said second type element is positioned in accordance with a predetermined number of units of said lesser order.

3. In a recorder, a first finger movable to positions representative of the number of units of one order, a first type element positioned in accordance with the movement of said first finger, a second finger movable to predetermined positions, a third finger movable to predetermined positions, a differential mechanism connected to said second and third fingers, a second type element positioned by said differential mechanism in accordance with the number of units of a lesser order, said first finger being adapted to travel predetermined distances representative of predetermined numbers of units of said one order, electrical means operable to effect an increase in the travel of said first finger by an amount representative of one unit of said one order, a switch operable to actuate said electrical means, and means positioned in accordance with the positionment of said second type element to operate said switch when said total number of units of said lesser order exceeds a predetermined number.

4. In a recorder, a first finger movable to positions representative of the number of units of one order, a first type element positioned in accordance with the movement of said first finger, a second finger movable to predetermined positions, a third finger movable to predetermined positions, a differential mechanism connected to said second and third fingers, a second type element positioned by said differential mechanism in accordance with the number of units of a lesser order, said first finger being adapted to travel predetermined distances representative of predetermined numbers of units of said one order, a lever operable to increase the travel of said first finger by an amount representative of one unit of said one order, and means movable with said second type element and engageable with said lever to operate said lever when said second type element is moved to a position representative of a predetermined number of units of said lesser order.

5. In a weight recorder, weight selector members positioned in accordance with a part of a load to be measured, a drop-weight operated member positioned in accordance with the remainder of the load to be measured, weight selector fingers movable into predetermined positions of engagement with said members, means to move said fingers varying distances into said predetermined positions, type elements positioned in accordance with the movement of said fingers to indicate the weight of the load, and control means comprising, a link connected with one of said fingers engageable with said drop-weight operated member, means displacing said link and increasing the extent of movement of the type element positioned by said one finger, and an actuator operated when another of said type elements reaches a limiting position to render said displacing and increasing means effective.

6. In a recording scale having an indicator and drop-weights, a weight selector disc movable with said indicator, a drop-weight operated segment, a plate, said segment and plate being moved in accordance with the number of effective drop-weights, a first finger movable into engagement with said disc, a second finger movable into engagement with said segment, a third finger movable into engagement with said plate, means to move said fingers varying distances into predetermined positions, the extent of movement of said fingers being representative of the load on said scale, a member connected to said third finger, an actuator operable to move said member and increase the extent of movement of said third finger, and means to operate said actuator when the combined movement of said first and second fingers exceeds a predetermined value.

7. In a recording scale having an indicator and drop-weights, a weight selector disc movable with said indicator, a drop-weight operated segment, a plate, said segment and plate being moved in accordance with the number of effective drop-weights, a first finger movable into engagement with said disc, a second finger movable into engagement with said segment, a third finger movable into engagement with said plate, means to move said fingers varying distances into predetermined positions, said disc, segment and plate having recessed surfaces, said fingers being movable into engagement with said recessed surfaces and the travel of said fingers being representative of the load on the scale, and control provision means to increase the travel of said third finger comprising, a leading edge on said third finger normally aligned with the recessed surface on said plate, a recessed edge on said third finger, and means to align said recessed edge with said recessed surface on said plate, whereby the travel of said third finger is increased.

8. In a recording scale having an indicator and drop-weights, a weight-selector disc movable with said indicator, a drop-weight operated segment, a plate, said segment and plate being moved in accordance with the number of effective drop-weights, a first finger movable into engagement with said disc, a second finger movable into engagement with said segment, a third finger movable into engagement with said plate, means to move said fingers varying distances into predetermined positions, a differential mechanism connected to said first and second fingers and having an output member positioned in accordance with the combined movement of said first and second fingers, an actuator operated by said output member when said member reaches a predetermined position, link means connected to said third finger, and means to displace said link means and increase the movement of said third finger when said actuator is operated.

9. In a recorder having first input means positionable in accordance with a part of the value of a condition to be recorded, and second input means positioned in accordance with the remainder of the value of such condition to be recorded, printing type elements, means including sensing elements movable to position sensing engagement with said first input means for correspondingly positioning certain of said type elements, other means including a movable sensing member having relatively spaced end portions for selective engagement with said second input means effective for positioning one of said type elements in accordance with engagement of a selected end portion of said sensing member with said second input means, and means controlled by predetermined movements of certain of said sensing elements for determining engagement of one of said end portions of the sensing member with said second input means.

10. In a recorder as defined by claim 9 further characterized in that the last said means includes an electromagnetic device in operative connection to the said movable sensing member, and an energizing circuit for said device including a normally open switch arranged to be closed in response to the said predetermined movements of certain of said sensing elements.

11. In a weighing and weight recording system providing a weighing scale having a rotary shaft angularly positionable in accordance with scale load weight, and a plurality of counter-weights selectively applicable to the scale for increasing the weighing capacity of the scale; weight recorder means comprising first, intermediate and high order printing type elements relatively positionable for printing the first, intermediate and high order digits of scale determined weights, stepped discs fixed on said rotary shaft, means including sensing elements engageable with certain of said stepped discs for positioning said first and at least one of said intermediate printing type elements, a control member positionable in accordance with scale capacity increasing application of one or more of said counter-weights, a differential device connected to another of said intermediate printing type elements and including sensing elements engageable with one of said stepped discs and said control member for positioning the last said printing type elements, a stepped element positionable by and in accordance with said control member, means including a sensing member engageable with said stepped member for positioning said high order printing type element, said sensing member having a stepped end and being shiftable for engagement selectively of one and another step of its stepped end with said stepped member, and means under control of said differential device, for controlling shifting of said sensing member.

12. In a weighing and weight recording system providing a weighing scale having a rotary shaft angularly positionable in accordance with scale load weight and a plurality of counter-weights selectively applicable to the scale for increasing the weighing capacity of the scale; weight recorder means comprising first, intermediate and high order printing type elements relatively positionable for printing the first, intermediate and high order digits of scale determined weights, stepped discs fixed on said rotary shaft, means including sensing elements engageable with certain of said stepped discs for positioning said first and at least one of said intermediate printing type elements, a control member positionable in accordance with scale capacity increasing application of one or more of said counter-weights, a differential device connected to another of said intermediate printing type elements and including sensing elements engageable with one of said stepped discs and said control member for positioning the last said printing type element, a stepped element positionable by and in accordance with said control member, a sensing member connected to said high order printing type element and having an end normally engageable with said stepped member for positioning the high order type element, said sensing element further having an abutment rearwardly of its said end and being shiftable to a position for engagement of said abutment with said stepped member, thereby to alter the position of said high order type element, and means operable in response to a predetermined extent of operation of said differential device for effecting shift of said sensing member to said position for engagement of its said abutment with said stepped member.

13. In a recorder having a stepped disc means positionable in accordance with the numerical value of a condition to be recorded, a member movable from an initial position to a first position representative of a given portion of the numerical value to be recorded, a stepped element positionable with said member, differential means including sensing elements movable into sensing engagement with one disc of said stepped disc means and said member, a type numeral bearing member positionable by said differential means, a shiftable sensing element having a stepped end and normally movable to sensing engagement of one step of its stepped end with said stepped element, means operable in response to operation of said differential means to a predetermined extent for shifting said shiftable sensing element to a position for sensing engagement of another step of its said stepped end with said stepped element, and a second type numeral bearing element positionable by said shiftable sensing element.

14. In combination with a drop-weight capacity weighing scale having a scale operated shaft and selectively applicable scale capacity increasing drop-weights, weight printing mechanism therefor including a stepped disc operated by said shaft, a control member positionable in accordance with selected application of said drop-weights and having a control surface, finger elements movable into position sensing engagement with said stepped disc and the control surface of said control member, a differential device actuated by movement of said finger elements, and including an actuating member movable to an extent proportional to the sensing movements of said finger elements, a type numeral bearing member positionable by and in accordance with the extent of movements of said actuating member, a stepped sector carried by and positionable with said control member, a sector sensing element having a terminal end for sensing engagement with said stepped sector, said terminal end providing a forward abutment step and a second abutment step spaced rearwardly of the forward step, said sensing element normally being disposed in a first position for sensing movement in a first path of displacement to engage said forward abutment step with said stepped sector, and being capable of lateral shift to a second position for sensing movement in a second path of displacement to engage said second abutment step with said stepped sector, a second type numeral bearing member positionable by and in accordance with sensing movements of said sensing element, and control means effective in response to movement of said actuating member to a predetermined extent, for laterally shifting said sensing element to said second position.

15. The combination as defined by claim 14 wherein the said control means comprises an electromagnet actuator in operative connection to said sensing element, and an energizing circuit for said electromagnet actuator, including a normally open switch operable to a switch-closed position by said actuating member upon movement thereof to the said predetermined extent, said switch in its closed position completing said circuit for energization of said electromagnet actuator to effect operation thereof to laterally shift said sensing element to said second position.

References Cited in the file of this patent

UNITED STATES PATENTS

| | | |
|---|---|---|
| 2,070,011 | Hadley | Feb. 9, 1937 |
| 2,370,805 | Leonard | Mar. 6, 1945 |